United States Patent
Hodges

(10) Patent No.: US 10,662,928 B2
(45) Date of Patent: May 26, 2020

(54) GENERATOR BELL-MOUNT FIXTURE AND METHODS OF USE

(71) Applicant: Christopher A Hodges, Brighton, CO (US)

(72) Inventor: Christopher A Hodges, Brighton, CO (US)

(*) Notice: Subject to any disclaimer, the term of this patent is extended or adjusted under 35 U.S.C. 154(b) by 0 days.

(21) Appl. No.: 16/246,653

(22) Filed: Jan. 14, 2019

(65) Prior Publication Data

US 2019/0226459 A1     Jul. 25, 2019

Related U.S. Application Data

(60) Provisional application No. 62/620,746, filed on Jan. 23, 2018.

(51) Int. Cl.
| | |
|---|---|
| *F02B 63/04* | (2006.01) |
| *H02K 7/18* | (2006.01) |
| *F03D 80/50* | (2016.01) |
| *F03D 9/25* | (2016.01) |

(52) U.S. Cl.
CPC .............. *F03D 80/50* (2016.05); *F03D 9/25* (2016.05); *H02K 7/1838* (2013.01); *F05B 2230/70* (2013.01); *F05B 2230/80* (2013.01)

(58) Field of Classification Search
CPC ......... F03D 80/50; F03D 9/25; H02K 7/1838; Y10T 29/49721; Y10T 29/4973; Y10T 29/49723; Y10T 29/49748; F05B 2230/70; F05B 2230/80; F16B 5/0225
USPC ..... 248/544, 645, 670, 674, 678; 29/402.01, 29/402.09
See application file for complete search history.

(56) References Cited

U.S. PATENT DOCUMENTS

| | | | | |
|---|---|---|---|---|
| 7,837,168 | B2 * | 11/2010 | Carter ...................... | H02K 5/26 248/300 |
| 2012/0200183 | A1 * | 8/2012 | Himmelmann ........ | H02K 7/006 310/89 |
| 2015/0135534 | A1 * | 5/2015 | Viscome ................. | F03D 13/10 29/889 |
| 2016/0146186 | A1 * | 5/2016 | Viscome ............... | F03D 1/0691 416/244 A |

* cited by examiner

*Primary Examiner* — Tulsidas C Patel
*Assistant Examiner* — Thomas K Quigley
(74) *Attorney, Agent, or Firm* — Leyendecker & Lemire, LLC

(57) ABSTRACT

A fixture and methods of using the fixture that can be used in situ to perform repair and maintenance work on a generator shaft and associated components of a wind turbine generator is described. The fixture is typically mounted to a plurality of the threaded bores provided in the generator housing used to attach the generator's end bell or the gearbox/transmission to the generator, and provides a platform for attaching accessory fixtures to support the shaft of the generator, as well as, provide for the mounting of tools used to maintain and repair the generator shaft.

20 Claims, 7 Drawing Sheets

GENERATOR BELL-MOUNT FIXTURE AND METHODS OF USE

RELATED APPLICATIONS

This application incorporates by reference in its entirety and claims priority to co-pending U.S. Provisional 62/620,746 filed on Jan. 23, 2018 and having the title Half End Bell Fixture and Methods of Use and same inventor as the present invention. This application further incorporates by reference in its entirety co-pending U.S. patent application Ser. No. 16/040,625 entitled "Modifed WYE Ring" filed on Jul. 20, 2018.

BACKGROUND

Wind turbines that convert wind into mechanical rotation through its blades and then convert the mechanical rotation into electric power for distribution on an electrical grid are well known. A typical wind turbine is illustrated in FIG. 1 and FIG. 2. As shown, the wind turbine 10 comprises a tower 20 that can rise a substantial distance off of a support structure on the ground. A support structure is attached to the top of the tower on which a generator assembly is mounted. The generator assembly typically includes a generator 45 and a gearbox/transmission 40. The generator assembly is enclosed in nacelle 15. Adjacent to one end of the nacelle a hub 30 is provided from which a plurality of rotor blades 25 are attached and extend outwardly therefrom. A low speed rotor shaft 35 extends inwardly from the hub and is operatively coupled with the gearbox/transmission 40. The gearbox/transmission is then typically coupled to the generator by way of the generator's high speed shaft 50. The high speed shaft extends through the generator housing and is typically supported on either end by bearing assemblies that are mounting in bell housings 55. Often generator windings (not shown) encircle the high speed shaft within the housing.

When in operation, terrestrial wind impacts the rotor blades 25 and imparts a torque on the low speed rotor shaft 35 causing it to rotate. The low speed rotor shaft is operatively coupled to the gear box/transmission 40 which increases the rotational speed and outputs it to the high speed rotor shaft 50. The rotation of the coil windings coupled to the high speed shaft in the generator 45 creates a three phase electrical current, which is directed out of the turbine and into an electrical grid by way of electrical cables that travel downwardly through the interior of the tower.

Periodically, it may be necessary to disconnect the generator 45 from the transmission 40 for inspection, repair and maintenance. Most inspections along with some basic maintenance can be carried out by a technician within the nacelle 15. However, substantial and/or serious repairs on the generator's high speed rotor shaft 50 and the associated windings/armatures has typically required the removal of the generator and/or the high speed shaft from the nacelle, which can include lowering the generator and/or the high speed shaft to the ground and transporting it to a repair facility. The process of removing a generator and/or high speed shaft from the turbine is time consuming, costly and potentially dangerous.

DETAILED DESCRIPTION

Figure 1:
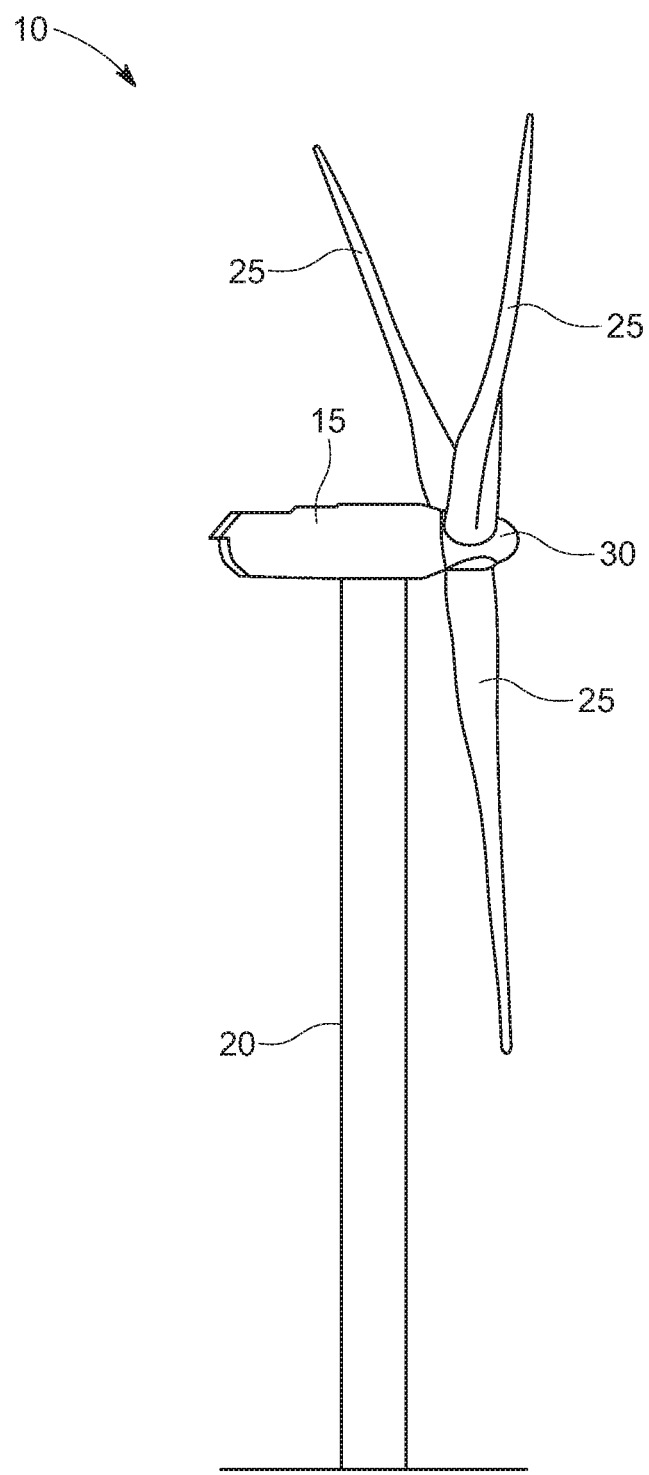
FIG. 1 is a perspective view of a typical wind turbine as is known in the prior art.
Figure 2:
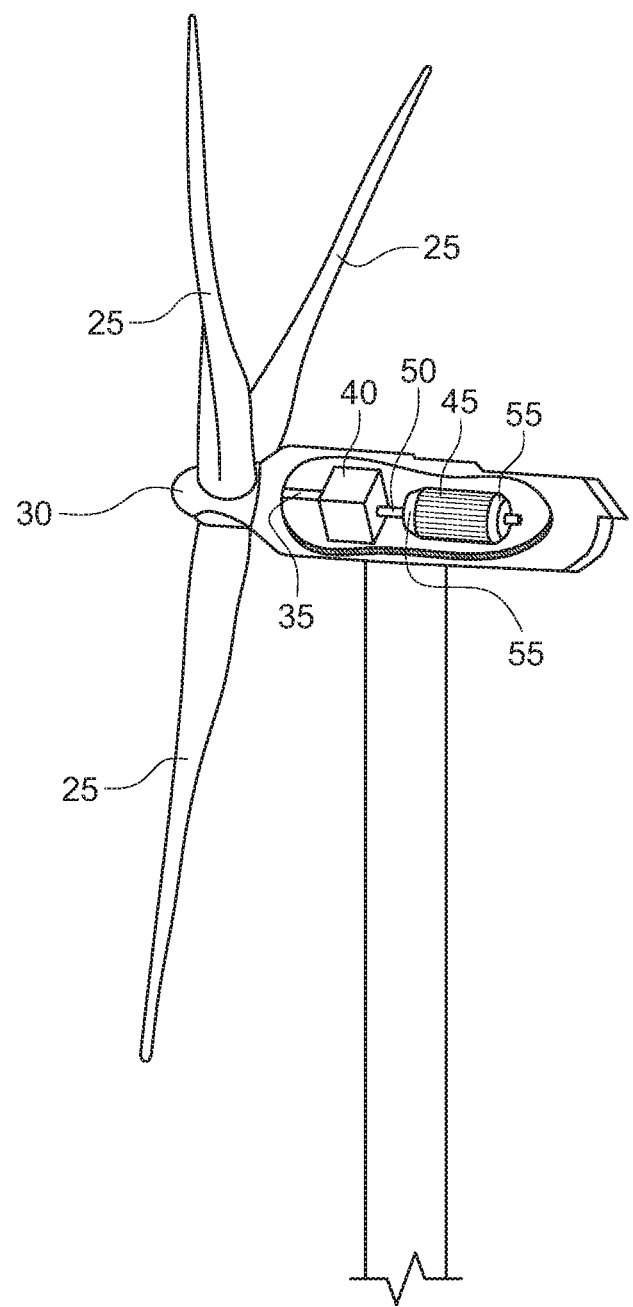
FIG. 2 is a partial cutaway of a wind turbine showing the various components housed within the nacelle as is known in the prior art.

Embodiments of the present invention comprise a fixture and methods of using the fixture that can be used in situ to perform repair and maintenance work on a generator shaft and associated components of a wind turbine generator. The fixture is typically mounted to a plurality of the threaded bores provided in the generator housing used to attach the generator's end bell or the gearbox/transmission to the generator.

The fixture typically includes a mounting plate, a platform that extends substantially orthogonally from the mounting plate, and one or more gusset plates that further attach and secure the platform to the mounting plate. The platform, which can also comprise a planar piece, typically includes a plurality of threaded or smooth-bore fastener holes that can be used to attach additional hardware to it. This additional hardware can include, but is not limited to: roller(s) that facilitate axial movement of the generator shaft, rollers that facilitate rotation of the shaft, stationary shaft supports, and milling or grinding tools.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The phrase "accessory fixture" as used herein refers to any fixture or support that is affixed to the bell-mount fixture's platform portion and is configured to hold or support the shaft of the generator.

The term "generator" as used herein is not limited in meaning only to electric generators but also includes (as applicable) electric motors.

The term "fixture" as used herein without descriptive adjectives generally refers to the generator bell-mount fixture unless the use of the term in context clearly refers to another type of fixture, such as one of the accessory fixtures.

The terms "gearbox" and "transmission" as used herein are to be considered interchangeable.

Embodiments of Bell-Mount Fixture

With primary reference to FIGS. 3-9, one embodiment of a bell-mount fixture 100 and various accessory fixtures are described for use with electric generators, such as the type used in wind turbines. The bell-mount fixture typically includes: (i) a mounting portion 105 configured to mount to the housing of a generator 45 where a bell end housing 55 or the gearbox/transmission would be typically attached to the generator; (ii) a platform portion 110 that extends generally orthogonally from the mounting portion and provides a generally horizontal top surface where other accessory fixtures or tools can be attached and secured; and (iii) a plurality of gussets 115 to provide support for the platform and assist in securing the fixture to the mounting portion. Some embodiments of the fixture can also include hardware, such as threaded bolts 107, for securing the various portions together. In other embodiments, the various portions can be welded together. In yet other embodiments, the bell-mount fixture can be fabricated as a single piece.

The mounting portion 105 can comprise a metal plate that can be in the form of a partial circle or semicircle having a plurality of mounting holes 120 distributed along a circumferential edge a predetermined radius from the mounting portions center of rotation. As illustrated herein, the mounting portion comprises a partially circular plate having an angular extent of about 3-4 radians and includes a partially circular center cutout having an angular extend of about 3-4 radians, The location of the holes correspond to threaded bores provided in the generator housing for securing the bell housing and/or gearbox thereto Additional mounting holes 122 can be provided on the plate as well to facilitate attachment of the gussets 115 thereto using threaded bolts or other suitable fasteners.

The platform portion 110 comprises a rectangular-shaped metal plate that includes a plurality of threaded or smooth bore through holes 130 distributed in a matrix pattern thereon that extend from the top surface towards the bottom surface. Additional bolt holes 132 can also be provided to facilitate the attachment of the gussets 115 & 125 thereto. The plate is typically about 0.75" to 2.0" thick and comprised of a suitable steel or aluminum alloy, although plates of other suitably stiff and strong materials are also contemplated. Further, the thickness of different embodiments can vary.

Two upper gussets 115 and two lower gussets 125 are shown. Like the platform portion 110, the gussets are typically comprised of steel or aluminum alloy plate. The plate is typically 0.75"-2.0" thick but the thicknesses can vary as can the material from which the gussets are constructed. As illustrated, the gussets are triangular in shape each with a vertical side including threaded bore holes (not shown) to secure it to the mounting portion 105, and a horizontal side including threaded bore holes 142 to secure it to the platform portion 110 using threaded fasteners.

Figure 3:
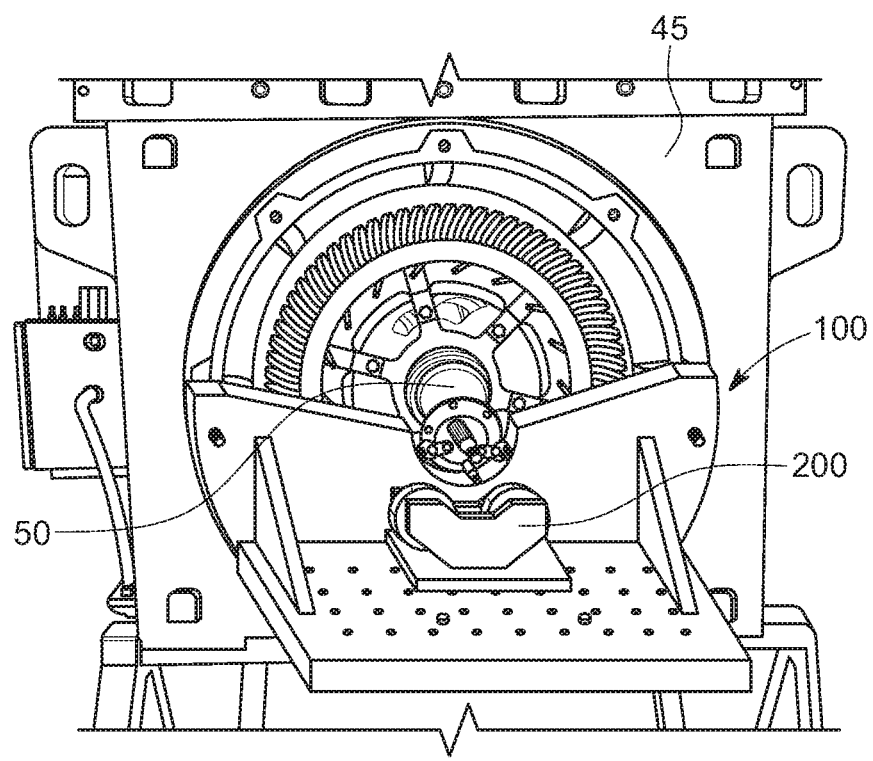
FIG. 3 is a perspective illustration of the bell-mount fixture mounted to the end of a generator further including a rotor balance bearings fixture secured thereto according to an embodiment of the present invention.
Figure 4:
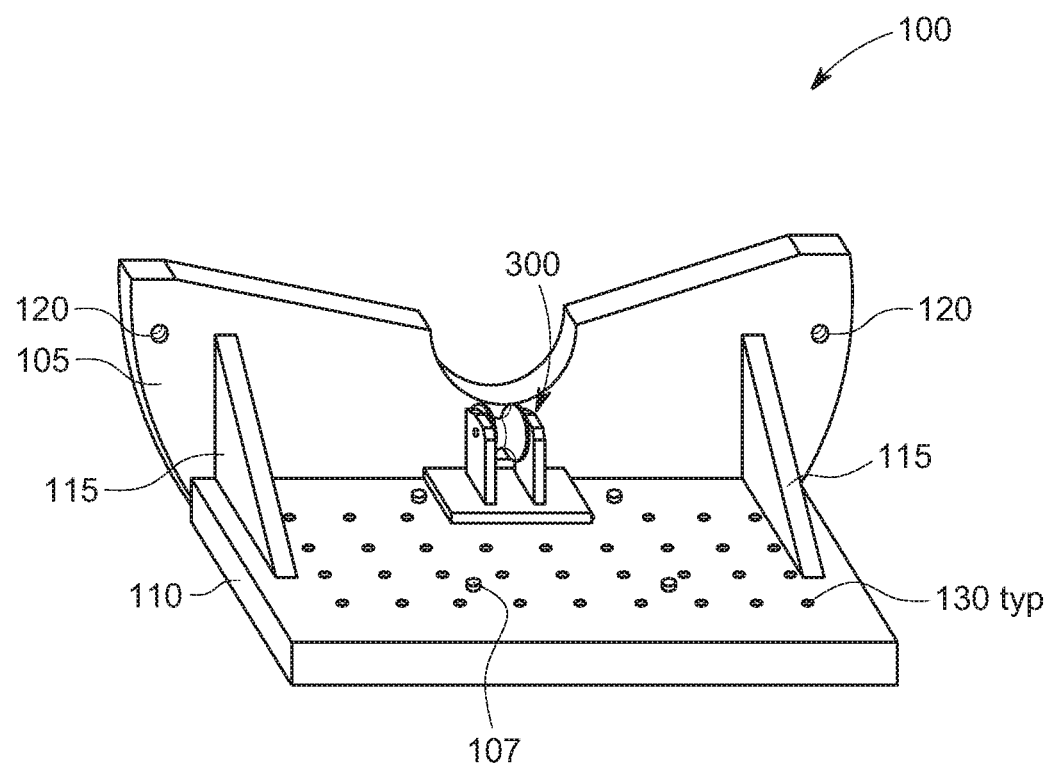
FIG. 4 is a perspective illustration of the bell-mount fixture further including a rotor removal support fixture secured thereto according to an embodiment of the present invention.
Figure 5:
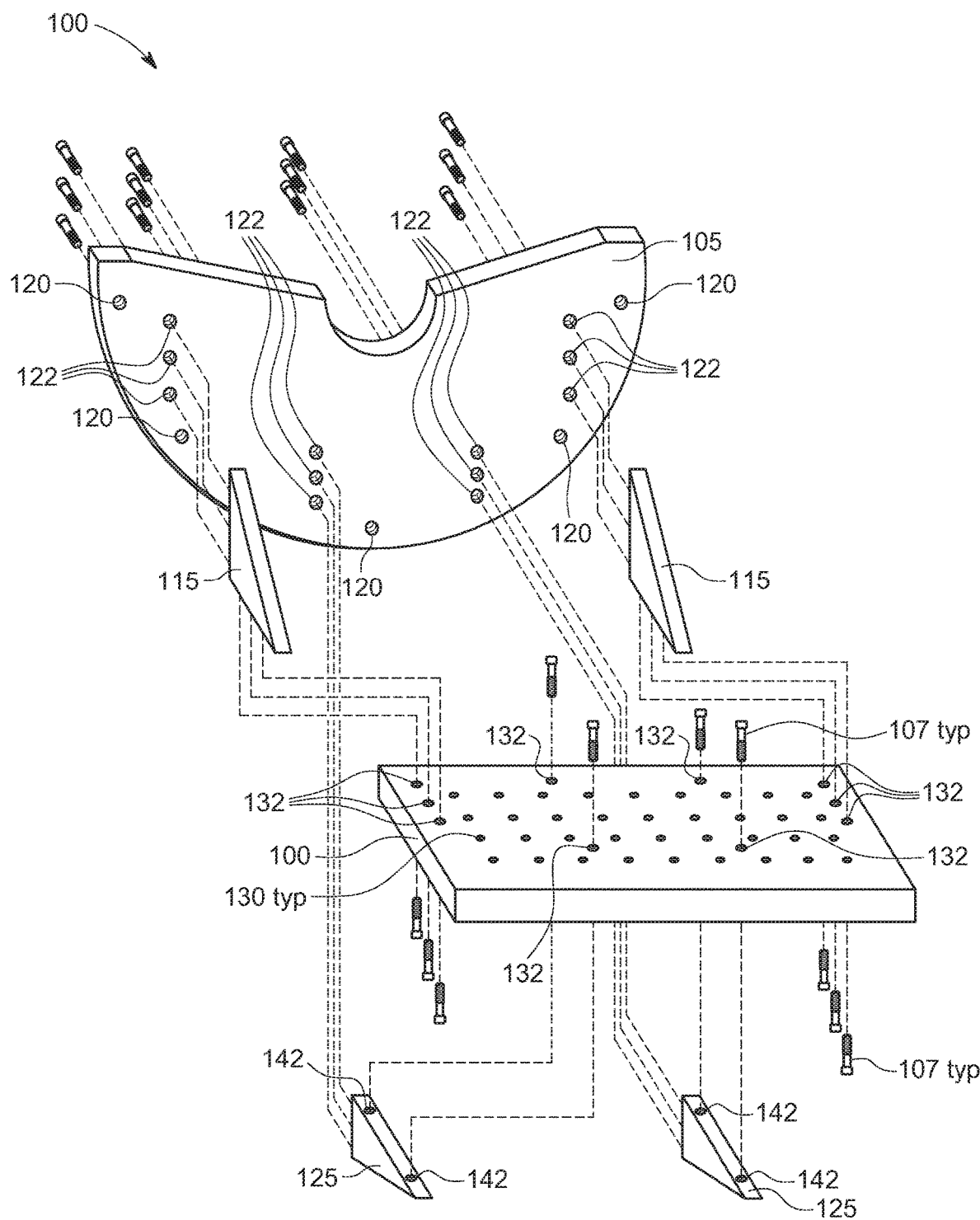
FIG. 5 is an exploded perspective illustration of the bell-mount fixture according to an embodiment of the present invention.

FIG. 4 illustrates an embodiment of the assembled fixture 100; whereas FIG. 3 illustrates the assembled fixture secured to the end of the generator 45. As indicated infra, the fixture by way of the mounting portion 105 is secured to the generator housing by way of threaded fasteners, and provides a horizontal platform to which various accessory fixtures and equipment can be fixedly secured. In FIG. 3, a rotor balance bearings accessory fixture 200 is shown secured to the platform 110. Of important note, as shown the high speed shaft 50 has not been moved outwardly of the generator housing and is not shown resting on the rotor balance bearings accessory fixture although it would likely be before commencing repair work thereon. In FIG. 4 a rotor removal support accessory fixture 300 is shown. These accessory fixtures 200 & 300 are individually illustrated in FIGS. 7 & 6 respectively and are described in greater detail below. The accessory fixtures are used to support the high speed shaft once the shaft is partially removed from the housing, as well as, allowing the shaft to be slid laterally or rotated depending on the fixture selected.

Machinery and/or tools used to refurbish and or repair the generator's shaft can also be fixed to the platform using fasteners and the fastener holes 130. For instance, commutator grinding and turning tools, such as those made by Martindale Electric Co. of Cleveland, Ohio, can be secured to the platform 110. Additionally, portable drills and tapping tools can be secured to the platform 110 by way of threaded fasteners or magnetically, if the platform is comprised of ferritic steel.

Figure 9:
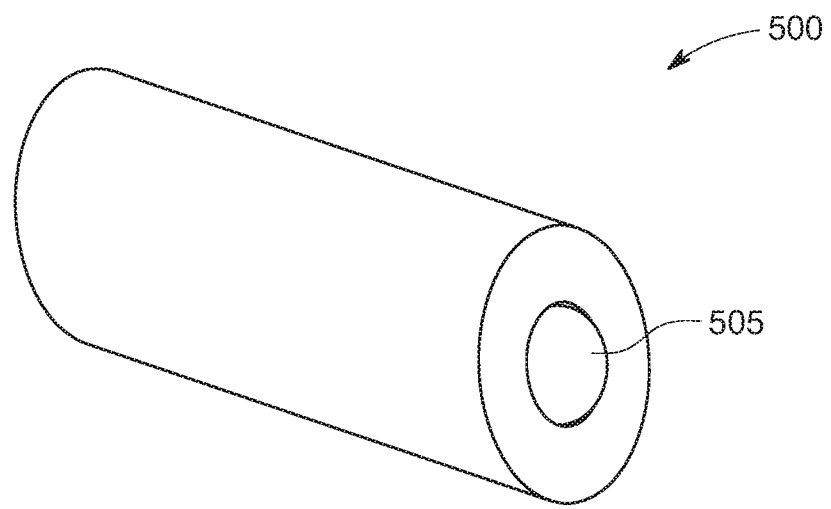
FIG. 9 is a perspective view of a rotor shaft mandrel according to an embodiment of the present invention.

FIG. 9 is an illustration of a rotor shaft mandrel 500 for receipt over the high speed shaft 50 as necessary for use with one or more of the various accessory fixtures 200, 300 & 400. The mandrel can be made of any suitable material but is typically comprised of steel or aluminum alloy. The axial through-bore 505 has an inside diameter essentially similar to the outside diameter of the end of the high speed shaft that it is to be received over. Although not shown one or more set screws can be provided to hold the mandrel in place, whereas, in other variations, the mandrel is held in place by friction.

Figure 6:
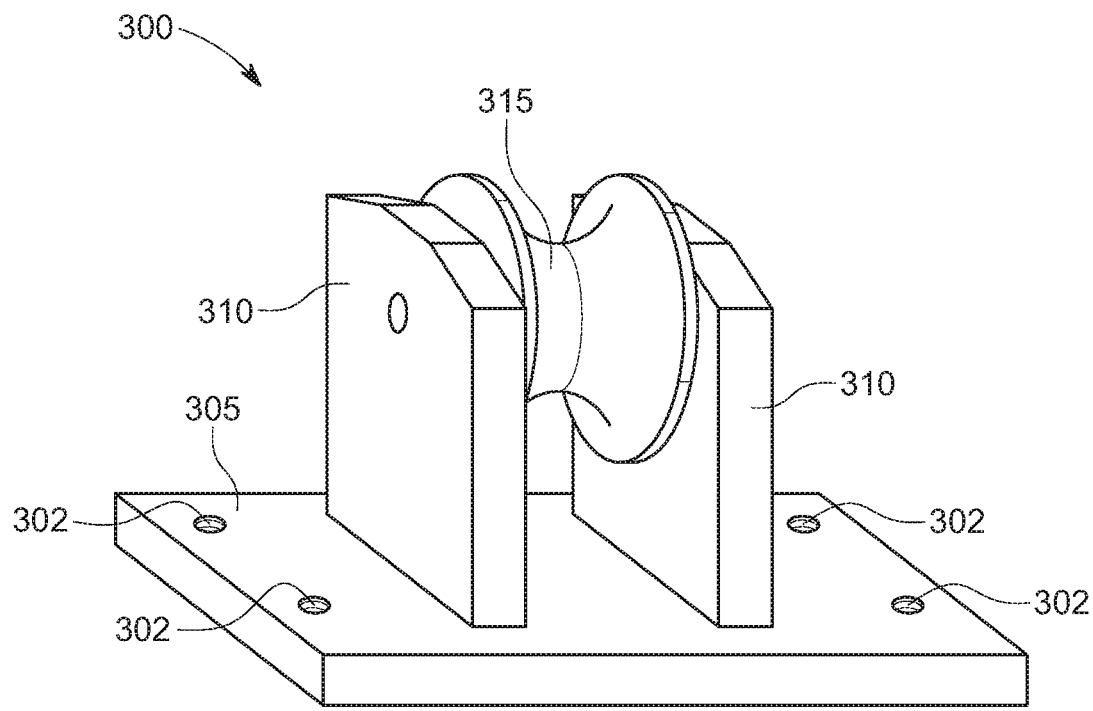
FIG. 6 is a perspective view of a rotor removal support fixture according to an embodiment of the present invention.

FIG. 6 shows a rotor removal support accessory fixture 300 that permits the lateral movement of the high speed shaft 50 when it is resting thereon. The accessory fixture comprises a base 305, which can be secured to the platform 110 by way of provided fastener holes 302. Two parallel spaced legs 310 extend orthogonally from the base to which they are affixed. A roller 315 extends between the legs typically by way of suitable bearings and an axle that has an axis of rotation substantially perpendicular to the high speed shaft 50 when installed on the platform. The roller concavely shaped as shown to cradle the high speed shaft with or without the use of a suitable mandrel 500. This accessory fixture permits the shaft to be moved axially when it is resting on the roller.

Figure 7:
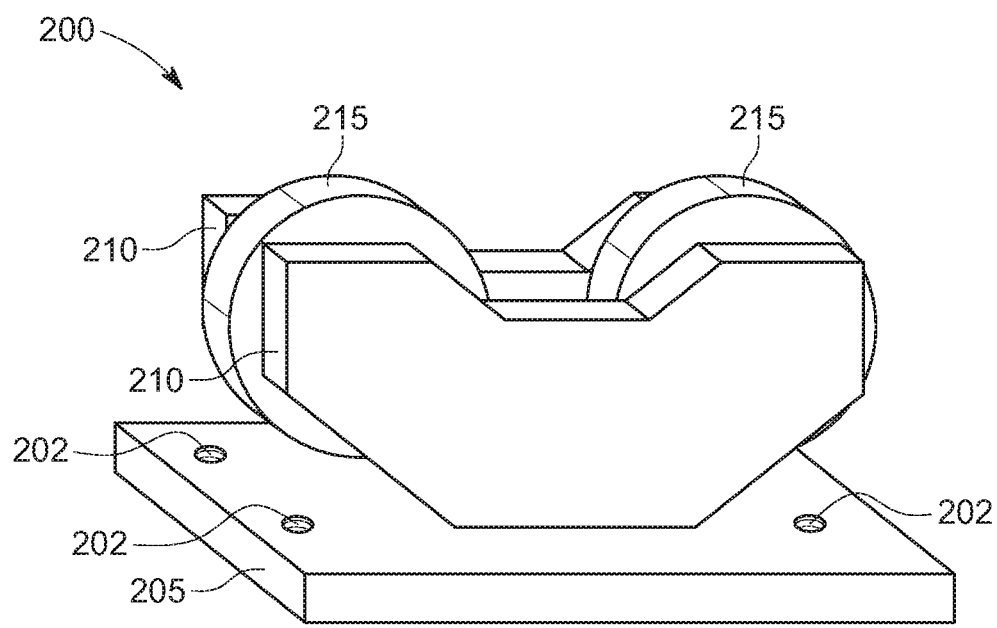
FIG. 7 is a perspective view of a rotor balance bearing fixture according to an embodiment of the present invention.

FIG. 7 shows a rotor balance bearings accessory fixture 200 that permits the rotational movement of the high speed shaft 50 when cradled thereon. The accessory fixture comprises a base 205, which can be secured to the platform 110 by way of provided fastener holes 202. Two parallel spaced legs 210 extend orthogonally and laterally to the right and left from the base to which they are affixed. Left and right rollers 215 are rotatably affixed the legs typically by way of suitable bearings and axles, and have an axis of rotation substantially parallel to the high speed shaft when installed on the platform. This accessory fixture permits the shaft to be rotated about it axis when it is resting on the roller.

Figure 8:
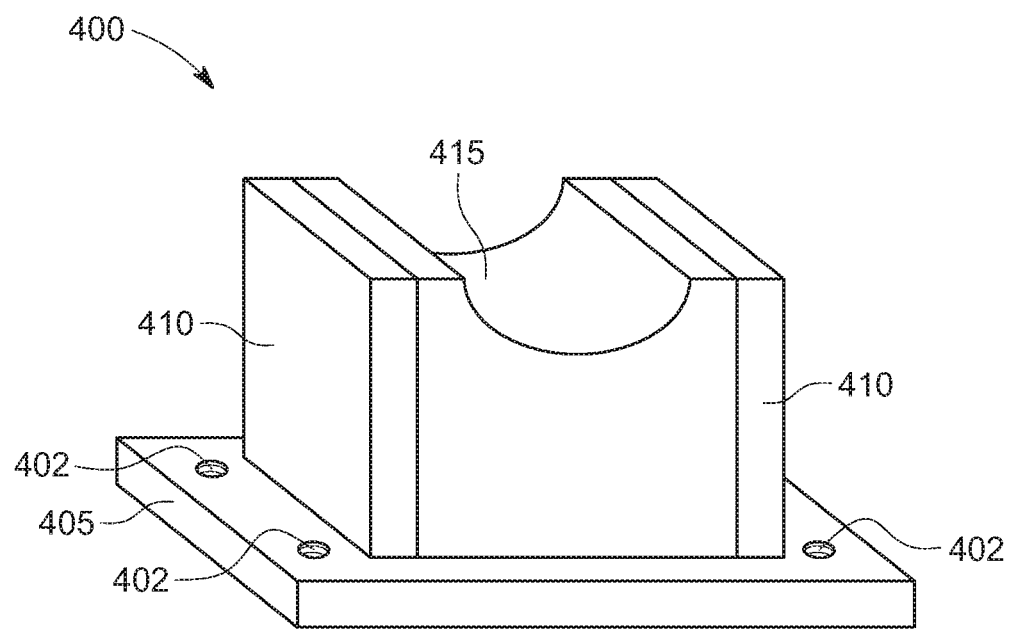
FIG. 8 is a perspective view of a rotor rotation fixture according to an embodiment of the present invention.

FIG. 8 shows a rotor rotation accessory fixture 400 that also permits the rotational movement of the high speed shaft 50 when cradled thereon albeit with the application of greater force than with the rotor balance bearings accessory fixture. The accessory fixture comprises a base 405, which can be secured to the platform 110 by way of provided fastener holes 402. Two parallel spaced legs 410 extend orthogonally from the base to which they are affixed. Between the legs a solid bearing member 415 is received that also typically rests on the surface of the base as shown. The bearing can be of any suitable material, but typically comprises a low friction plastic such as Teflon™ or high density polyethylene.

The foregoing accessory fixtures are merely exemplary and other types of suitable accessory fixtures are contemplated to hold or support the rotor and other associated components of the generator as might be necessary to affect an inspection, refurbishment and/or repair using the bell-mount fixture 100.

Methods of Using Embodiments of the Bell-Mount Fixture

The bell-mount fixture 100 can be used as a platform for maintenance, refurbishment, and repair of a generator's high speed shaft 50. The actual processes being performed will dictate the type of accessory fixture utilized and the machinery affixed to the platform.

First, the high speed shaft is typically disconnected from the gearbox 40. The bell housing(s) 55 are removed from one or both ends. The bell-mount fixture 100 is mounted to the generator housing by way off the threaded bell housing mounting holes using appropriate threaded fasteners. The desired accessory fixture is secured to the platform 110 in the proper location. As applicable, the machinery necessary to perform the desired maintenance/refurbishment/repair operation, such as a turning tool, is secured to the platform.

Typically before performing the desired operation on the shaft 50, The shaft is moved partially from the generator's housing and placed onto the chosen support accessory fixture. As necessary, a shaft mandrel 500 may be fit and secured on the shaft prior to this step. Depending on the accessory fixture, the shaft may be moved laterally or rotated relative to the housing as necessary for a particular machining operation to be performed on the shaft or its components.

For example, where the bearing surface on the end of the shaft has become worn and requires refinishing, the rotor balance bearing fixture 200 will typically be secured to the platform 100 along with a turning tool. A means for rotating the shaft may also be attached to the shaft and the platform. The refinishing operation will comprise turning the shaft while using the turning tool to remove material from the bearing surface to renew it.

After the maintenance/refurbishment/repair operation is complete, the shaft 50 can be moved back into place within the generator housing (if partially removed therefrom), The machinery and/or the accessory fixture(s) can be removed from the platform 110, and the bell-mount fixture 100 can be removed from the generator housing. The bell housing(s) 55 can be reinstalled and the gearbox 40 reconnected to the generator.

As can be appreciated, the bell-mount fixture is configured to permit in-situ maintenance/refurbishment and repair operations that would otherwise require the removal of the generator from the tower 20 at substantial and significant cost. However, as convenient and desired, the bell-mount fixture can also be used on generators that have been removed from or not yet fitted in a tower Additionally, the bell mount fixture can be used on electric generators that are associated with other types of electric power generation. Variations can also be used to perform work on large electric motors.

VARIATIONS AND OTHER EMBODIMENTS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For instance, the bell-mount fixture can have a form and construction substantially different from the embodiment specifically described herein. In one variation, the platform and mounting portion can be integrally formed with or without gussets. In other variations, the look or configuration of the various sections or portions can vary, often significantly, from the illustrated embodiment. For instance, the mounting portion may not have a semi circular shape. In another version, the platform portion may further include two or more legs that extend downwardly from the bottom surface thereof to provide additional support for the platform and the weight of the shaft incident on the platform and any equipment or machinery attached to the platform.

I claim:

1. A fixture for mounting to a housing of an electric generator/motor by way of bell housing mounting bores in a housing of the generator, the fixture comprising:
   a mounting portion, the mounting portion including a front surface spaced from a substantially flat vertically-orientated back surface with a plurality of fastener bores extending from the front surface and through the back surface and being configured for alignment with two or more of the bell housing mounting bores, and a platform portion, the platform portion being attached to the mounting portion including at least a planar top surface, the top surface being substantially orthogonal to the mounting portion back surface.

2. The fixture of claim 1, further comprising one or more gusset portions, each gusset portion being attached to both the mounting portion and the platform portion.

3. The fixture of claim 1 wherein the platform portion comprises a plurality of bores arranged in a matrix extending inwardly from the top surface.

4. The fixture of claim 3, wherein the plurality of bores are threaded.

5. The fixture of claim 1, wherein the platform portion is comprised of a ferritic material.

6. The fixture of claim 1, wherein the mounting portion comprises a partially circular plate having an angular extent of about 3-4 radians and includes a partially circular center cutout having an angular extend of about 3-4 radians.

7. The fixture of claim 2, wherein one or more gusset portions comprise at least two lower gusset portions attached to the platform at a bottom surface thereof.

8. The fixture of claim 7, wherein the wherein one or more gusset portions further comprise at least two upper gusset portions attached to the platform portion at the top surface.

9. The fixture of claim 2, wherein one or more gusset portions are each secured to the mounting portion and the platform portion by way of threaded fasteners.

10. A combination comprising the electric generator/motor and the fixture of claim 1 with the fixture of claim 1 attached to the electric generator/motor with a plurality of threaded fasteners.

11. A combination comprising the fixture of claim 1 and a wind turbine, the wind turbine including at least a tower, a support structure attached to a top of the tower, a generator attached to the support structure, wherein the fixture is attached to the generator with a plurality of threaded fasteners.

12. The combination of claim 11, further including a turning tool attached to the top surface platform portion, and one of a rotor removal support accessory fixture and a rotor balance bearing accessory fixture also attached to the top surface of the platform portion with a shaft of the generator resting on the accessory fixture.

13. The combination of claim 10, further including a rotor removal support fixture mounted to the platform portion.

14. The combination of claim 10, further including a rotor balance bearing fixture mounted to the platform portion.

15. A fixture for mounting to the housing of an electric generator/motor by way of bell housing mounting bores in the housing, the fixture comprising:
 a mounting portion, the mounting portion including a front surface spaced from a substantially flat vertically-orientated back surface with a plurality of fastener bores extending from the front surface and through the back surface and being configured for alignment with two or more of the bell housing mounting bores;
 a platform portion, the platform portion having at least a planar top surface and an opposing bottom surface, the top surface being substantially orthogonal to the mounting portion back surface, the platform portion further including a plurality of threaded bores arranged in a matrix extending through the platform portion from the top surface to the bottom surface; and
 a plurality of gusset portions, each gusset portion being attached to both the mounting portion and the platform portion.

16. The fixture of claim 15, wherein the mounting portion comprises a partially circular plate having an angular extent of about 3-4 radians and includes a partially circular center cutout having an angular extend of about 3-4 radians.

17. The fixture of claim 15, wherein the each of the plurality of gusset portions are attached to the mounting and platform portions with threaded fasteners.

18. A combination comprising the electric generator/motor and the fixture of claim 15 with the fixture of claim 15 being attached to the electric generator/motor with a plurality of threaded fasteners.

19. A combination comprising the fixture of claim 15 and a wind turbine, the wind turbine including at least a tower, a support structure attached to a top of the tower, a generator attached to the support structure, wherein the fixture is attached to the generator with a plurality of threaded fasteners.

20. A method of repairing a shaft of the generator in a wind power turbine in situ using the fixture of claim 1, the method comprising:
 operatively disconnecting the shaft from a gearbox;
 removing a bell housing from at least an end of the housing of the generator;
 with the generator atop a tower of the wind turbine, attaching the fixture to the end of the housing with threaded fasteners received through the mounting bores of the mounting portion and into the bell housing mounting bores of the housing;
 attaching a rotor balance bearing accessory fixture to the top surface of the platform portion,
 attaching a turning tool to the top surface of the platform portion;
 removing the shaft partially from the housing and resting it on the rotor balance bearing fixture;
 rotating the shaft while resting on the rotor balance bearing fixture and resurfacing at least a section of the shaft using the turning tool;
 removing the fixture from the housing;
 reinstalling the bell housing; and
 operatively reattaching the shaft to the gearbox.

\* \* \* \* \*